United States Patent
Chess et al.

(10) Patent No.: US 9,053,319 B2
(45) Date of Patent: *Jun. 9, 2015

(54) CONTEXT-SENSITIVE TAINT PROCESSING FOR APPLICATION SECURITY

(75) Inventors: Brian V Chess, Palo Alto, CA (US); Sean Patrick Fay, San Francisco, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 271 days.

This patent is subject to a terminal disclaimer.

(21) Appl. No.: 13/248,981

(22) Filed: Sep. 29, 2011

(65) Prior Publication Data

US 2013/0086687 A1     Apr. 4, 2013

(51) Int. Cl.
*G06F 21/00* (2013.01)
*G06F 21/53* (2013.01)
*G06F 21/54* (2013.01)
*G06F 21/55* (2013.01)
*H04L 29/06* (2006.01)

(52) U.S. Cl.
CPC .............. *G06F 21/53* (2013.01); *H04L 63/1433* (2013.01); *G06F 21/54* (2013.01); *G06F 21/554* (2013.01)

(58) Field of Classification Search
CPC . H04L 63/1441; H04L 63/1433; G06F 21/54; G06F 21/566
USPC ......................................................... 726/25
See application file for complete search history.

(56) References Cited

U.S. PATENT DOCUMENTS

| | | | |
|---|---|---|---|
| 7,292,160 B1 | 11/2007 | Wang | |
| 7,617,532 B1 * | 11/2009 | Alexander et al. | 726/22 |
| 7,624,440 B2 | 11/2009 | Jallad et al. | |
| 8,127,360 B1 * | 2/2012 | Wilhelm et al. | 726/25 |
| 2002/0178271 A1 * | 11/2002 | Graham et al. | 709/229 |
| 2005/0060537 A1 * | 3/2005 | Stamos et al. | 713/156 |
| 2006/0277604 A1 * | 12/2006 | Pandit et al. | 726/22 |
| 2008/0109680 A1 * | 5/2008 | Kodaka et al. | 714/38 |
| 2011/0082848 A1 | 4/2011 | Goldentouch et al. | |
| 2011/0145918 A1 * | 6/2011 | Jung et al. | 726/22 |
| 2011/0321016 A1 * | 12/2011 | Haviv et al. | 717/128 |
| 2012/0167209 A1 * | 6/2012 | Molnar et al. | 726/22 |
| 2013/0086676 A1 * | 4/2013 | Chess et al. | 726/22 |

FOREIGN PATENT DOCUMENTS

WO    WO-2009139994    11/2009

OTHER PUBLICATIONS

A Systematic Analysis of XSS Sanitization in Web Application Frameworks, (Research Paper), European Symposium on Research in Computer Security (ESORICS 2011), Sep. 12-14, 2011, pp. 150-171.

Di Lucca, G.A. et al., Identifying Cross Site Scripting Vulnerabilities in Web Applications, (Research Paper), Proceedings of Sixth IEEE International Workshop on Web Site Evolution, 2004, Sep. 11, 2004, pp. 71-80.

* cited by examiner

*Primary Examiner* — Hadi Armouche
*Assistant Examiner* — Bryan Wright
(74) *Attorney, Agent, or Firm* — Hewlett-Packard Patent Department

(57) ABSTRACT

In one implementation, a tag is associated with a tainted value of an application and an output context of the application that is associated with output from the application that includes the tainted value is determined. A taint processing is a applied to the tainted value in response to the output of the tainted value, the taint processing is compatible with the output context.

18 Claims, 6 Drawing Sheets

US 9,053,319 B2

CONTEXT-SENSITIVE TAINT PROCESSING FOR APPLICATION SECURITY

BACKGROUND

Tainted values (e.g., data values received from untrusted sources) within applications can result in corrupted data values within and/or output from the application. Such corrupted data value can cause undesired operations within the application. As an example, a tainted value received as input to an application from an untrusted source can include an attack against a potential security vulnerability (e.g., code or values) that causes the application to malfunction. As another example, tainted values within an application can be provided as output to clients of the application and cause those clients to malfunction or operate in an undesirable manner.

To address such security vulnerabilities, some applications apply various statically-specified taint processings to tainted values to remove or mitigate security vulnerabilities in those tainted values. A taint processing is a routine or method that is applied to a tainted value to prevent that tainted value from posing a security vulnerability in the application. For example, an application can include code or instructions to apply a particular taint processing to a tainted value at a portion of the application. Accordingly, that particular taint processing is applied to the tainted value each time that portion of the application is executed or processed.

DETAILED DESCRIPTION

Figure 1:
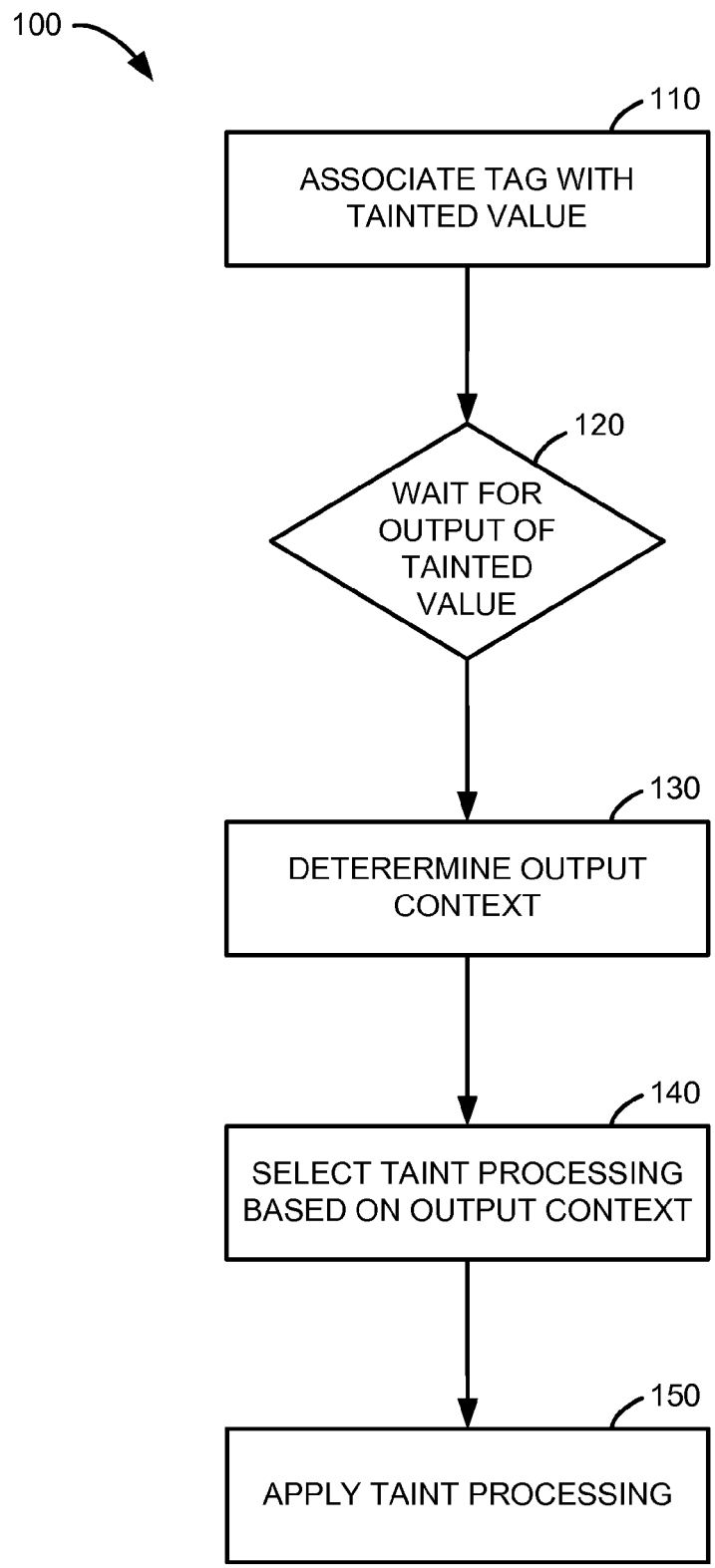
FIG. 1 is a flowchart of an application security process, according to an implementation.

Although statically-specified taint processings can address some security vulnerabilities in tainted values, such application security methodologies can fail to sufficiently mitigate security vulnerabilities in many applications. For example, such methodologies often rely on developers to specify an effective taint processing (e.g., a taint processing that effectively mitigates a security vulnerability in a tainted value) during development of the application. Developers can make mistakes such as specifying an ineffective taint processing for a particular tainted value or portion of the application which result in security vulnerabilities that persist through such statically-specified taint processings.

Additionally, such methodologies are often ineffective due to dynamic execution paths within applications. For example, because the execution path of an application can be dynamic (e.g., respond differently to different input), a developer may be unable to select an effective taint processing for a tainted value (or portion of the application including the tainted value) during development. For example, the runtime context (or state) of the application associated with that tainted value can be unknowable during development. As another example, the number of potential runtime contexts of the application associated with that tainted value can be prohibitively large to include code or instructions in the application to handle each context.

Implementations discussed herein apply context-sensitive taint processing to tainted values to implement application security. For example, implementations discussed herein determine the context of an application during runtime and select a taint processing to apply to a tainted value within the application based on that context. Accordingly, developers need not determine an effective taint processing during development. Rather, a taint processing that is compatible with the context of the application can be selected and applied to a tainted value when that tainted value is used by the application. Said differently, implementations discussed herein perform context-sensitive application security.

As a specific example, an application security system (or context-sensitive application security system) determines an output context of an application associated with output (e.g., storing the tainted value at a data store or providing the tainted value to a user or client of the application) of a tainted value from the application. The application security system then selects a taint processing that is compatible with the output context (e.g., effectively mitigates or removes a security vulnerability of a tainted value in that output context), and applies the taint processing to mitigate a security vulnerability from the tainted value for that output context. The tainted value is then provided (or delivered) to a client of the application.

As used herein, the term "module" refers to a combination of hardware (e.g., a processor such as an integrated circuit or other circuitry) and software (e.g., machine- or processor-executable instructions, commands, or code such as firmware, programming, or object code). A combination of hardware and software includes hardware only (i.e., a hardware element with no software elements), software hosted at hardware (e.g., software that is stored at a memory and executed or interpreted at a processor), or at hardware and software hosted at hardware.

Additionally, as used herein, the term "application" refers to a module that receives input, performs one or more operations with respect to that input, and provides an output. For example, an application can be a web application hosted at a web server that receives input values from a client via a communications link such as the Internet, processes the input values to generate output values, and provides the output values to the client via the communications link. Furthermore, as used herein, the singular forms "a," "an," and "the" include plural referents unless the context clearly dictates otherwise. Thus, for example, the term "value" is intended to mean one or more values or a combination of values. For example, a value can include a single value such as a floating point number, integer number, text character, or a sequence of values such as a character or text string.

FIG. 1 is a flowchart of an application security process, according to an implementation. Tainted values are data values that are received (e.g., as input to an application) from untrusted, unverified, or potentially harmful sources or derived from other tainted values (e.g., input to an application). For example, data values received as input from a client of the application, data values read from an untrusted (e.g., external or non-validated) data store, or data values derived from (e.g., generated from, calculated using, influenced by, or based on) tainted values can be referred to as tainted values. Tainted values can be an exploitation vector for a security vulnerability such as cross-site scripting (XSS) vulnerability or structured query language (SQL) injection vulnerability of a web application. For example, input provided to a web application can include code that can be executed at a client of the web application (e.g., a web browser) to attack the client.

A client of the application is a module from which input is received at the application and/or to which output is provided by the application. In other words, as used herein, the term "client" refers to any module that provides input to and/or receives output from an application. Thus, as used herein, the term "client" includes, for example, peers, clients and servers of a traditional client-server relationship, and masters and slaves of a traditional master-slave relationship associated with the application.

A tag is associated with a tainted value at block 110 to, for example, label or identify the tainted value as or including an attack against a potential security vulnerability of an application or client. A tag is data that identifies or flags properties, traits, characteristics, attributes, conditions, or other information related to a value. Here, the tag associated with the tainted value identifies the tainted value as such.

As an example, an application can include code or instructions to associate a tag with tainted values. As a specific example, an application can invoke a routine, function, method, or other code or instructions to associate a tag with a tainted value. Such routines, functions, methods, or other code or instructions can be defined at, for example, a library. A library is a group of codes or instructions that are executed at a processor to realize or implement one or more routines, subroutines, functions, or methods.

A tag can be, for example, a value or sequence of values that is associated with the tainted value by adding the tag to the tainted value. For example, a tag can be a character or sequence of characters (or other values) and a numeric value that are added to the tainted value to identify the tainted value and a length of size of the tainted value. Moreover, such a character or sequence of characters is distinguishable from regular (e.g., other than a tag) output from an application. As an example, such a character can be a character that does not typically occur in regular output from an application such as, for example, a NULL value. Alternatively, for example, such a sequence of characters can have, as a group, a low probability of occurrence in regular output from an application.

As another example, a tag can include a begin (or open) tag that is prepended to the tainted value, and an end (or close) tag that is appended to the tainted value. Said differently, the tag can be added to a tainted value to enclose the tainted value. In other implementations, a tag can be metadata associated with a tainted value. For example, a portion or portions of a data store can include metadata related to a tainted value. More specifically, for example, a database or table at a memory can include metadata related to a tainted value, and that metadata can include a tag.

Process 100 then waits at block 120 for output (or some other use) of the tainted value. For example, an application security system implementing process 100 can analyze data values output from an application to determine whether any of the data values are tainted values. That is, for example, the application security system can determine whether any of the data values output from the application are tagged as tainted values. Referring to the example tags discussed above in relation to block 110, the application security system can access metadata associated with data values or parse the data values themselves to determine whether each data value is a tainted value. If output of a tainted value is detected at block 120, process 100 proceeds to block 130 to determine an output context of the application associated with output of the tainted value.

An output context is a context in which data values are output from an application. Data values are output from applications when those data values (or copies thereof) are provided (e.g., via a communications link, shared memory, electronic mailboxes, intra-processor communications, inter-processor communications, or other data transfer methodologies) to another application, to a data stores, to a client.

For example, if the application is a web application, data values can be output via a communications link. Furthermore, the output context can be the interpretation context of the web application. In other words, the output context can be the context in which a client of the application (e.g., a web browser for a web application) receiving the data values output from the application interprets those data values. As specific example, the output context of a web application can be a Hypertext Markup Language (HTML) output context, a JavaScript output context, a Cascading Style Sheets (CSS) output context, or other output context in which the web application outputs data values to clients.

In some implementations, the output context of the application changes during execution of the application. Referring again to an example implementation in which the application is a web application, the application can output data values during execution that should be interpreted by a client as CSS data at a first time, as HTML at a second time, as JavaScript at a third time, and as HTML again at a fourth time. That is, output from the application can include data values in a CSS output context at a first time, data values in an HTML output context at a second time, data values in a JavaScript output context at a third time, and data values in an HTML output context at a fourth time. In such implementations, the current output context (e.g., the output context in which the tainted value is output) of the application is determined at block 130. In other words, the output context that is associated with output of the tainted value detected at block 120 is determined at block 130.

The output context can be determined, for example, by monitoring the output of the application at the application security system. That is, the application security system can monitor the output of the application to determine the output context of the application. More specifically, for example, the application security system can include an output context monitor module that receives output from the application (e.g., via a runtime environment of the application) and interprets that output, for example, as a client of the application such as a web browser. The output context monitor module can, thus, track or monitor the current output context of the application. The application security module can then access an identifier or descriptor of the output context at the output context monitor module at block 130.

At block 140, a taint processing to be applied to the tainted value is selected based on the output context. Said differently, the taint processing that will be applied to the tainted value is selected from a group of taint processings based on the output context of the application. For example, a security policy for an application or application security system can specify taint processings which are compatible with output contexts. A taint processing is compatible with an output context if that taint processing effectively mitigates a security vulnerability of a tainted value output in that output context.

As an example, a security policy can specify that an output-context-specific encoding is compatible with an associated output context, and that all other taint processing is incompatible with that output context. As a specific example, a security policy can specify that an HTML encoding is compatible with an HTML output context, a JavaScript encoding is compatible with a JavaScript output context, and a CSS encoding is compatible with a CSS output context.

The taint processing selected at block 140 is then applied to the tainted value at block 150. A taint processing is any analysis, manipulation, modification, or other processing applied to a data value (such as a tainted value) to remove, mitigate, identify, or otherwise affect a security vulnerability or potential security vulnerability of that data value. For example, a taint processing can include input sanitization for an input string that will be used by an application as part of an SQL query (e.g., to prevent SQL injection). As a specific example of sanitization, taint processing can include encoding data values output from an application using an escaped character set such as an HTML escape character set, a JavaScript escape character set, an Extensible Markup Language (XML) escape character set, a CSS escape character set, or other encoding. Such encodings can mitigate or prevent security vulnerabilities such as code or instruction injection via XSS attacks.

A taint processing can be implemented as a module such as, for example, an application specific integrated circuit (ASIC) or a subroutine, a function, a method, a library routine, or other group of instructions (or code representing instructions) hosted at a processor. For example, a taint processing can be an encoding library routine that receives a tainted value as an input and encodes the tainted value to mitigate a security vulnerability in the tainted value. As a more specific example, an identifier of a variable, container, or memory location at which the tainted value is stored is provided as input to the encoding library routine, and the encoding library routine encodes the tainted value within that variable, container, or memory location. In other words, the taint processing processes the tainted value. That tainted value can then be provided to a client of the application.

Figure 2:
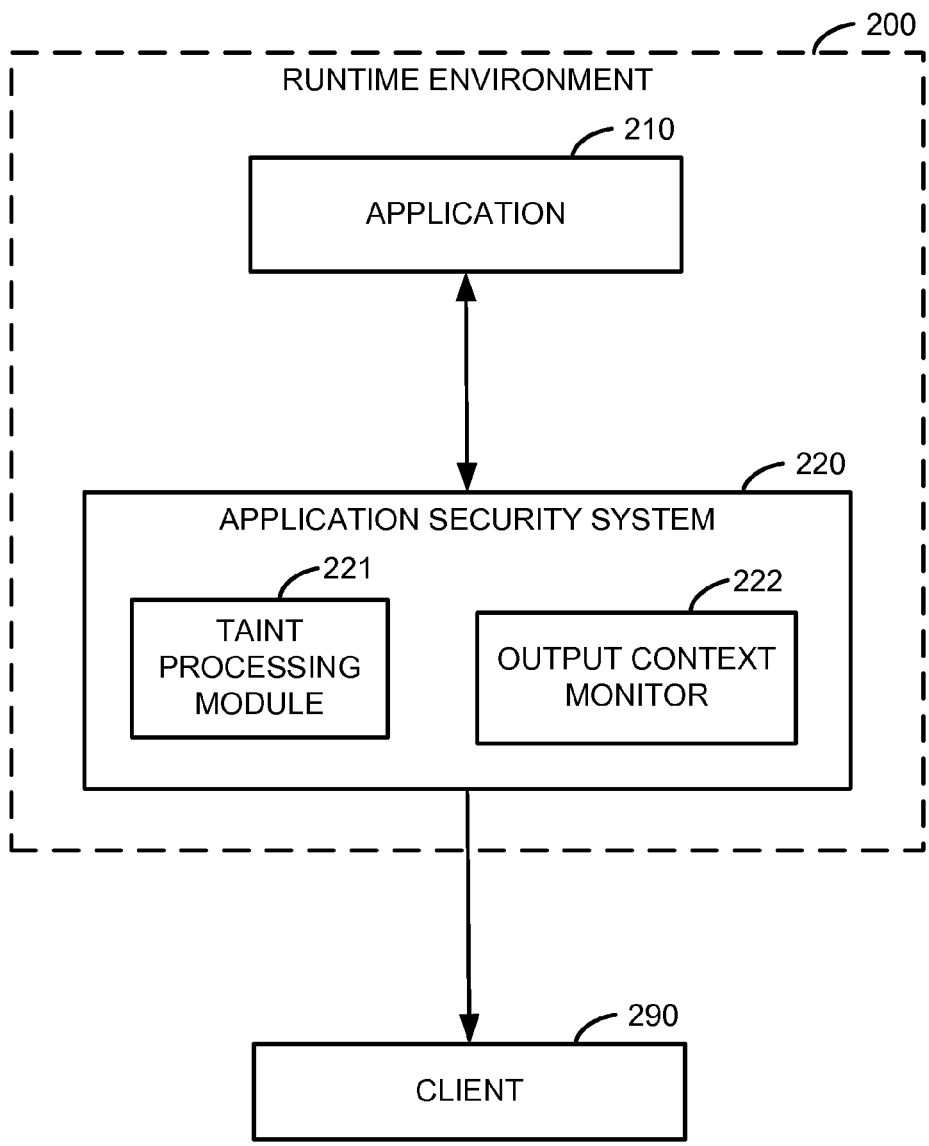
FIG. 2 is a schematic block diagram of an environment including an application security system, according to an implementation.

FIG. 2 is a schematic block diagram of an environment including an application security system, according to an implementation. Application security system 220 includes taint processing module 221 and output context monitor 222. Taint processing module 221 and output context monitor 222 are modules that implement application security system 220. Although various modules (i.e., combinations of hardware and software) are illustrated and discussed in relation to FIGS. 2 and 3 and other example implementations, other combinations or sub-combinations of modules can be included within other implementations. Said differently, although the modules illustrated in FIGS. 2 and 3 and discussed in other example implementations perform specific functionalities in the examples discussed herein, these and other functionalities can be accomplished at different modules or at combinations of modules. For example, two or more modules illustrated and/or discussed as separate can be combined into a module that performs the functionalities discussed in relation to the two modules. As another example, functionalities performed at one module as discussed in relation to these examples can be performed at a different module or different modules.

Runtime environment 200 is an environment hosted at a processor and memory accessible to the processor that provides various services to application 210 and/or application security system 220. For example, runtime environment 200 provides, for example, libraries, input and output routines, code interpretation, execution isolation, and/or services during execution or runtime of application 210 at the processor. In other words, application 210 executes within runtime environment 200. As specific examples, runtime environment 200 can be a virtual machine, a Java™ Runtime Environment, or a Microsoft .NET™ runtime environment.

Application security system 220 can attach to or instrument runtime environment 200 (or to application 210 via runtime environment 200) to interact with application 210. For example, runtime environment 200 can implement an application programming interface (API), hooks (e.g., to manipulate handling of library routine or function calls, method invocations, messages, or events), or other mechanisms via which application security system 220 can interact with application 210 during execution (or runtime) of application 210.

In other implementations, application security system 220 can instrument runtime environment 200 with modified libraries or other resources via which application security system 220 can interact with application 210 during execution of application 210. Said differently, application security system 220 can modify or instrument runtime environment 200, and interact with application 210 via the modifications or instrumentation to runtime environment 200. As a specific example, application security system 220 can replace an output library of runtime environment 200 with a modified output library that allows application security system 220 to receive output from application 210. In one example implementation, application security system 220 can instrument runtime environment 200 to intercept output from application 210. Application security system 220 then analyzes, processes, and forwards that output to client 290.

Tainted values within application 210 are tagged during execution of application 210. For example, application 210 can include a module or a group of modules that tag tainted values. As a specific example, application 210 can include a routine that is applied to data values (or tainted values) received as input to the application and associates tags with (or tags) those data values as tainted values. As another example, application 210 can provide tainted values to a module within runtime environment 200 such as a routine of a library or application (or web) framework within runtime environment 200, which associates tags with those tainted values.

In some implementations, application security system 220 provides such a module to runtime environment 200. That is, application security system 220 can instrument runtime environment 200 with such a module. In yet other implementations, application 210 can provide tainted values to application security system 220 (e.g., via runtime environment 200), and application security system 220 can associate tags with those tainted values.

Additionally, application security system 220 receives output from application 210. For example, as discussed above, application security system 220 can receive output (e.g., tainted values and/or other data values output) from application 210 via runtime environment 200. Application security system 220 then processes (or handles) the output.

As a specific example, output received from application 210 is provided to output context monitor 222. Output context monitor 222 monitors or tracks the output context of an application. In other words, output context monitor 222 maintains a descriptor or identifier of the current output context of the application. As a specific example, output context monitor 222 can receive the output from the application and interpret the output (e.g., the data value output) from the application as a client of the application to monitor the output context. Accordingly, the output context descriptor (i.e., description or identifier of the current output context of the application)

maintained by output context monitor 222 represents the interpretation context (or state) of the client for the output.

Application security system 220 determines whether the output from application 210 includes a tainted value. If the output does not include a tainted value, application security system 220 provides (or delivers or forwards) the output to client 290 without applying a taint processing to the output. If, however, the output includes a tainted value, taint processing module 221 receives a context identifier associated with output of the tainted value (i.e., an output context descriptor that represents the output context of the application when the tainted value is output from the application) from output context monitor 222, and taint processing module 221 selects a taint processing for the output context of the application. For example, taint processing module 221 can access a security policy to determine which taint processing from a group of taint processings should be selected for a particular output context.

Taint processing module 221 then applies the selected taint processing to the tainted value (or the output including the tainted value), and the output is subsequently provided to the client. In some implementations, output from application 210 is processed at application security system 220 in a block mode. That is, a group of data values is received from application 210, applied to output context monitor 222, provided to taint processing module 221 if there are any tainted values in the group of data values, and then forwarded to client 290. In other implementations, output from application 210 is processed at application security system 220 in a stream mode. That is, output from application 210 is processed at application security system 220 as it is provided to application security system 220 without waiting for a predetermined amount of data values to be received.

Figure 3:
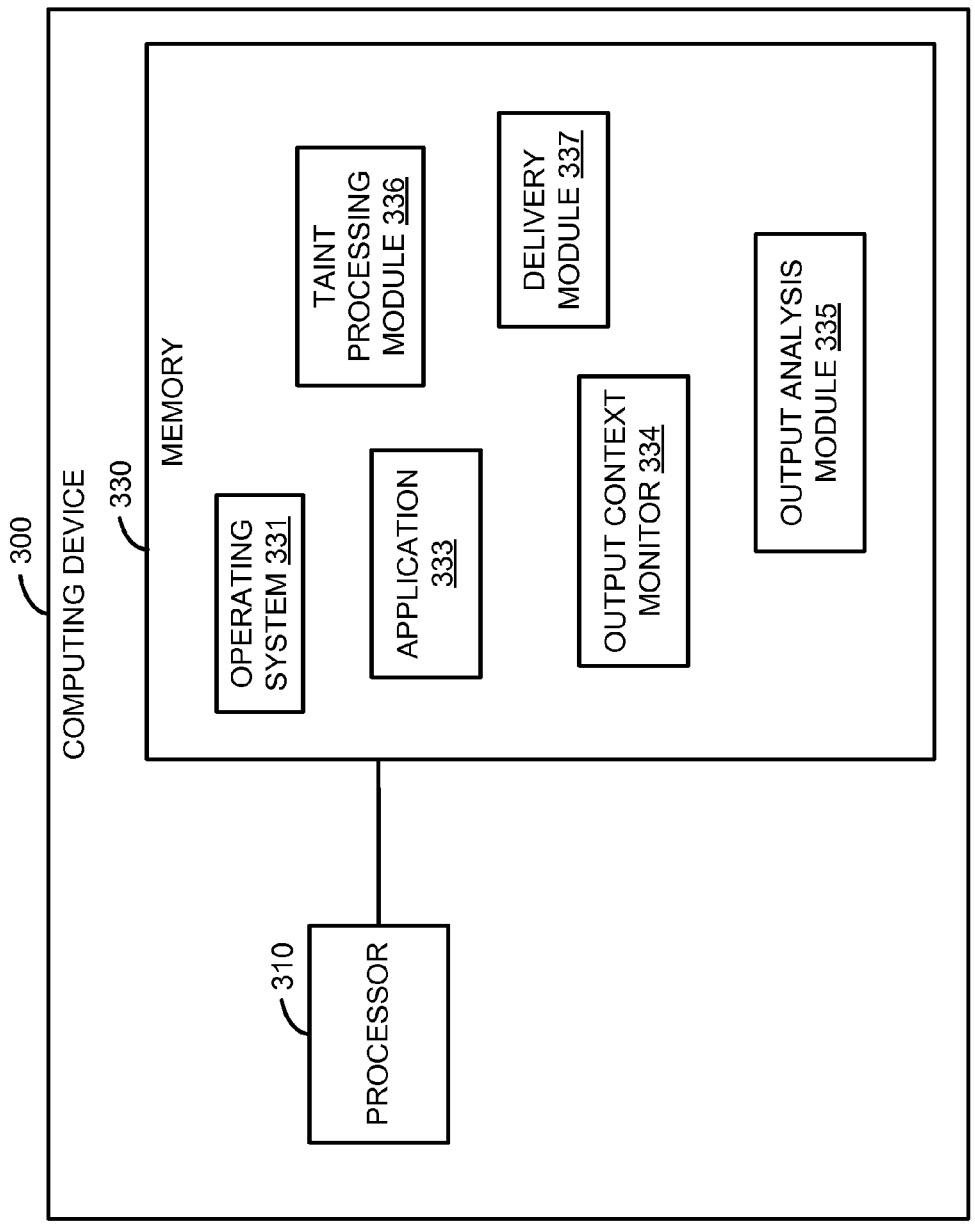
FIG. 3 is a schematic block diagram of a computing device including an application security system, according to an implementation.

FIG. 3 is a schematic block diagram of a computing device including an application security system, according to an implementation. Computing device 300 includes processor 310 and memory 330. Processor 310 is any combination of hardware and software that executes or interprets instructions, codes, or signals. For example, processor 310 can be a microprocessor, an application-specific integrated circuit (ASIC), a distributed processor such as a cluster or network of processors or computing devices, a multi-core or multi-processor processor, or a virtual machine.

Memory 330 is a processor-readable medium that stores instructions, codes, data, or other information. As used herein, a processor-readable medium is any medium that stores instructions, codes, data, or other information non-transitorily and is directly or indirectly accessible to a processor. Said differently, a processor-readable medium is a non-transitory medium at which a processor can access instructions, codes, data, or other information. For example, memory 330 can be a volatile random access memory (RAM), a persistent data store such as a hard disk drive or a solid-state drive, a compact disc (CD), a digital video disc (DVD), a Secure Digital™ (SD) card, a MultiMediaCard (MMC) card, a CompactFlash™ (CF) card, or a combination thereof or other memories. In some implementations, memory 330 can be integrated with processor 310, separate from processor 310, or external to computing device 300.

Memory 330 includes operating system 331, application 333, output context monitor 334, output analysis module 335, taint processing module 336, and delivery module 337. Output context monitor 334, output analysis module 335, taint processing module 336, and delivery module 337 collectively implement an application security system. Operating system 331, application 333, output context monitor 334, output analysis module 335, taint processing module 336, and delivery module 337 are each instructions or code that—when executed at processor 310—cause processor 310 to perform operations that implement, respectively, an operating system, an application, an output context monitor, an output analysis module, a taint processing module, and a delivery module. Said differently, operating system 331, application 333, output context monitor 334, output analysis module 335, taint processing module 336, and delivery module 337 are hosted at computing device 300.

Output context monitor 334 and taint processing module 336 are similar to output context monitor 222 and taint processing module 221, respectively, illustrated in FIG. 2. Output analysis module 335 determines whether output received from application 333 includes a tainted value, and provides tainted values to taint processing module 336. For example, output analysis module 335 can analyze or parse output received from application 333 to determine whether the output includes one or more tags associated with a tainted value or group of tainted values. As another example, output analysis module 335 can access metadata associated with data values output from application 331 to determine whether that metadata includes tags identifying one or more data values as tainted values. More specifically, for example, output analysis module 335 can access that metadata based on the address or memory location of a variable output from application 333.

Delivery module 337 provides output from application 333 to clients of application 333. More specifically, delivery module 337 provides output from application 333 after one or more taint processings are applied to tainted values, if any, within the output. As an example, of interaction among application 333, output context monitor 334, output analysis module 335, taint processing module 336, and delivery module 337 are discussed in more detail below in relation to FIG. 4.

In some implementations, computing device 300 can be a virtualized computing device. For example, computing device 300 can be hosted as a virtual machine at a computing server. Moreover, in some implementations, computing device 300 can be a virtualized computing appliance, and operating system 331 is a minimal or just-enough operating system to support (e.g., provide services such as a communications stack and access to components of computing device 300 such as a communications interface module (not shown)) an application security system.

An application security system (e.g., an application security system including output context monitor 334, output analysis module 335, taint processing module 336, and delivery module 337) can be accessed or installed at computing device 300 from a variety of memories or processor-readable media. For example, computing device 300 can access a remote processor-readable medium via a communications interface module (not shown) and the application security system at that processor-readable medium. As a specific example, computing device 300 can be a thin client that accesses operating system 331 and the application security system during a boot sequence.

As another example, computing device 300 can include (not illustrated in FIG. 3) a processor-readable medium access device (e.g., CD, DVD, SD, MMC, or a CF drive or reader) and the application security system at a processor-readable medium via that processor-readable medium access device. As a more specific example, the processor-readable medium access device can be a DVD drive at which a DVD including an installation package for the application security system is accessible. The installation package can be executed or interpreted at processor 310 to install the application security system at computing device 300 (e.g., at memory 330). Computing device 300 can then host or execute the application security system.

In some implementations, an application security system can be accessed at or installed from multiple sources, locations, or resources. For example, some components or modules of the application security system can be installed via a communications link, and other components or modules of the application security system can be installed from a DVD.

Figure 4:
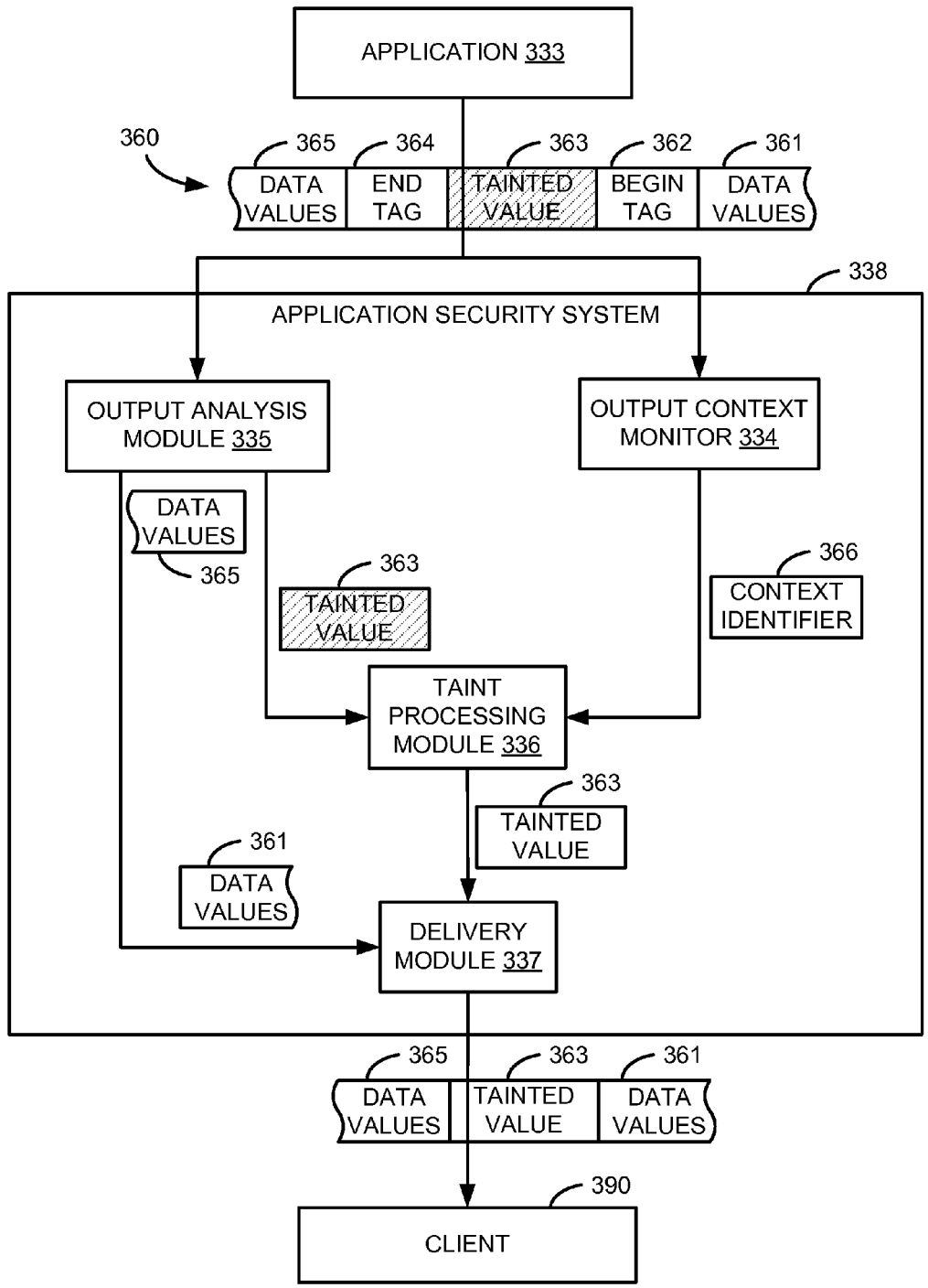
FIG. 4 is an illustration of data flow within an application security system, according to an implementation.

FIG. 4 is an illustration of data flow within the application security system illustrated in FIG. 3, according to an implementation. Output 360 from application 333 includes data values 361, begin tag 362, tainted value 363, end tag 364, and data values 365. As illustrated in FIG. 4, begin tag 362 and end tag 364 are collectively a tag that encloses tainted value 363 and is used at application security system 338 to identify tainted value 363 as a tainted value. In other implementations, application security system 338 can identify tainted value 363 as a tainted value based on another tag (e.g., metadata or a signal representing a tag) provided by application 333.

Output 360 is provided to output context monitor 334 and output analysis module 335 within application security system 338. Output context monitor 334 analyzes, parses, or interprets output 360 to monitor, track, or otherwise determine the output context (e.g., maintain a current output context) of application 333, and provides context identifier 366 to taint processing module 336. For example, output context monitor 334 can provide context identifier 366 (e.g., a signal or other data) to taint processing module 336 each time output context monitor 334 determines that the current output context of application 333 has changed or been altered. That is, output context monitor 334 can proactively update taint processing module 336 about changes in the output context of application 333. In other implementations, output context monitor 334 can provide context identifier 366 to taint processing module 336 in response to a request from taint processing module 336 for the current output context of application 333. That is, taint processing module 336 can determine the output context of application 333 using information (e.g., context identifier 366) pushed to taint processing module 336 by output context monitor 334, or using information pulled from output context monitor 334 by taint processing module 336.

Output analysis module 335 parses output 360 and/or processes other information (e.g., metadata or signals representing tags) provided to application security system 338 to identify tainted value 363 within output 360. As illustrated in FIG. 4, output analysis module 335 identifies tainted value 363 within output 360 based on begin tag 362 and end tag 364. In other implementations, output analysis module 335 can identify tainted value 363 within output 360 based on metadata or a signal provided by application 333. Output analysis module 335 then provides tainted value 363 to taint processing module 336.

Taint processing module 336 determines the output context of application 333 associated with tainted value 363 (e.g., the current output context of application 333 when tainted value 363 is output from application 333) based on context identifier 366, and selects a taint processing that is compatible with that context from a group of taint processings. In some implementations, output analysis module 335 and output context monitor 334 synchronously process output 360 to synchronize tainted values provided to taint processing module 336 with context identifier provided by output context monitor 334. In other words, output analysis module 335 and output context monitor 334 can synchronously process output 360 to ensure that context identifier 366 provided by output context monitor 334 is associated with tainted value 363 provided to taint processing module 336.

After the selected taint processing is applied to tainted value 363, tainted value 363 (which may have been modified or altered by the selected taint processing) is provided to delivery module 337. Delivery module 337 also receives data values 361 and data values 365 from output analysis module 335. Delivery module 337 then provides (or delivers) data values 361, tainted value 363, and data values 365 to client 390. In some implementations, delivery module 337 receives signals or commands from output analysis module 335 and/or taint processing module 336 to synchronize delivery of data values 361, tainted value 363, and data values 365 to client 390. That is, output analysis module 335 and/or taint processing module 336 provide signals or commands to delivery module 337 to indicate an order of data values 361, tainted value 363, and data values 365. In other implementations, data values 361, tainted value 363, and data values 365 are serially provided to delivery module 337 by output analysis module 335 and/or taint processing module 336 to preserve an order of data values 361, tainted value 363, and data values 365.

As illustrated in FIG. 3, application 333 and application security system 338 are hosted at a common computing device. For example, components (e.g., modules) of application security system 338 and application 333 can execute within a common runtime environment. Moreover, in some implementations, application security system 338 or components thereof can be integrated with application 333. For example, application 333 can include code or instructions that, when executed at a processor, implement application security system 338 or components thereof. As another example, application 333 can include code or instructions that, when executed at a processor, provide output from application 333 to a library, framework, or another module implementing application security system 338 or components thereof. As specific examples, application security system 338 or components thereof can be implemented as Java™ technologies such as Java Servlets, filter components, or Java Enterprise Edition libraries or components; or as Apache™ modules in the Apache™ web server.

Figure 5:
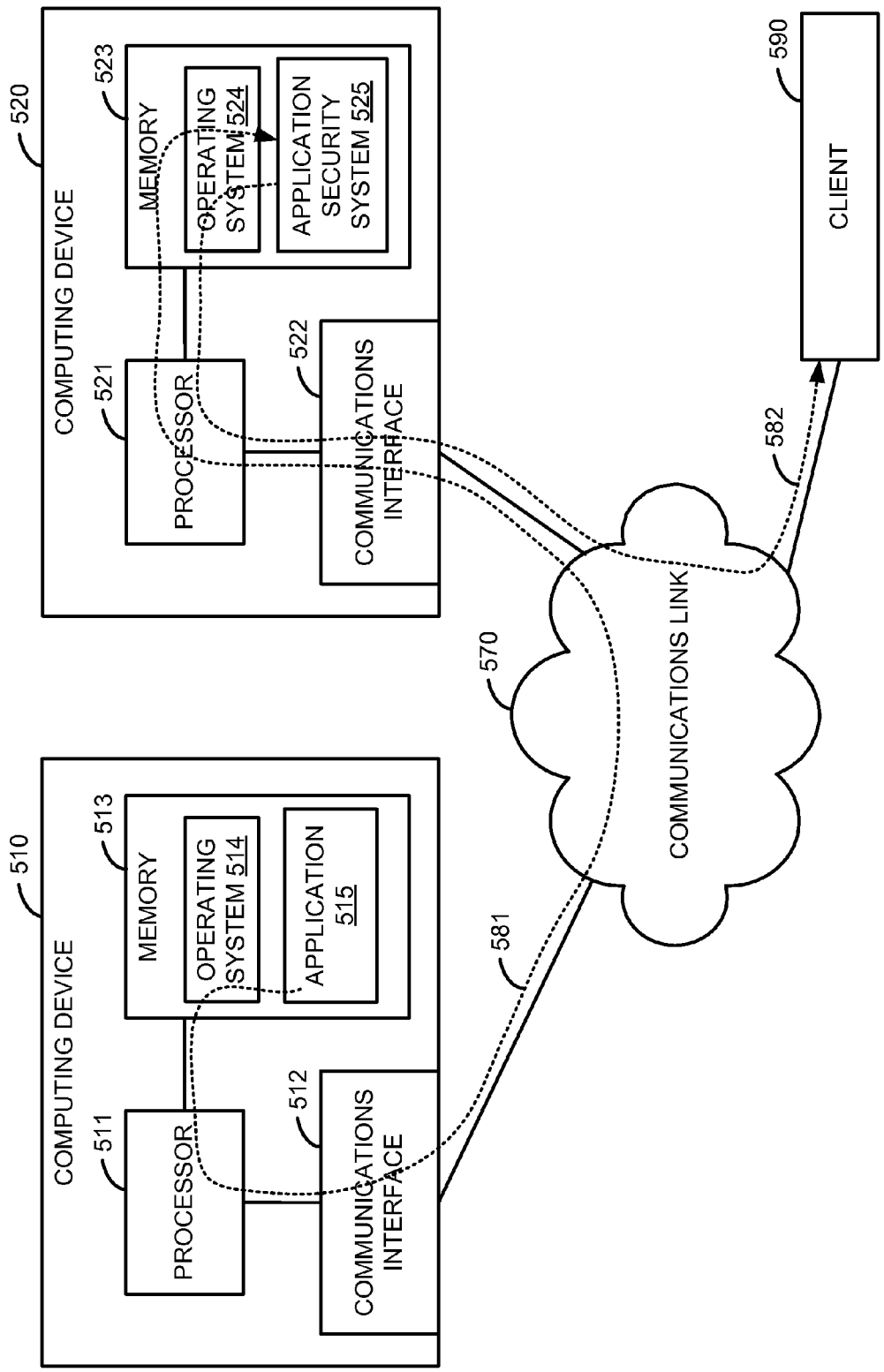
FIG. 5 is a schematic block diagram of an environment including an application security system, according to another implementation.

In other implementations, an application and an application security system can be implemented at separate computing devices. For example, FIG. 5 is a schematic block diagram of an environment including an application security system, according to another implementation. Computing device 510 includes processor 511, communications interface 512, and memory 513, which includes operating system 514 and application 515. Computing device 520 includes processor 521, communications interface 522, and memory 523, which includes operating system 524 and application security system 525. Client 590 is a client of application 515 hosted at computing device 510. Computing device 510, computing device 520, and client 590 are in communication one with another via communications link 570.

Communications link 570 includes devices, services, or a combination thereof that define communications paths between computing device 510, computing device 520, client 590, and/or other devices or services. For example, communications link 570 can include one or more of a cable (e.g., twisted-pair cable, coaxial cable, or fiber optic cable), a wireless link (e.g., radio-frequency link, optical link, or sonic link), or any other connectors or systems that transmit or support transmission of signals. Communications link 570 can include communications networks such as an intranet, the Internet, other telecommunications networks, or a combination thereof. Additionally, communications link 570 can include proxies, routers, switches, gateways, bridges, load balancers, and similar communications devices. Furthermore, the connections or communications paths illustrated in FIG. 5 are logical and do not necessarily reflect physical connections.

As illustrated in FIG. 5, application 515 provides data to client 590 via computing device 520 along communications path 581 and communications path 582. For example, computing device 520 can be a proxy server or other computing server or service. In some implementations, client 590 provides data to application 515 directly via communications link 570. In other implementations, client 590 provides data to application 515 indirectly via communications link 570 and computing device 520.

Figure 6:
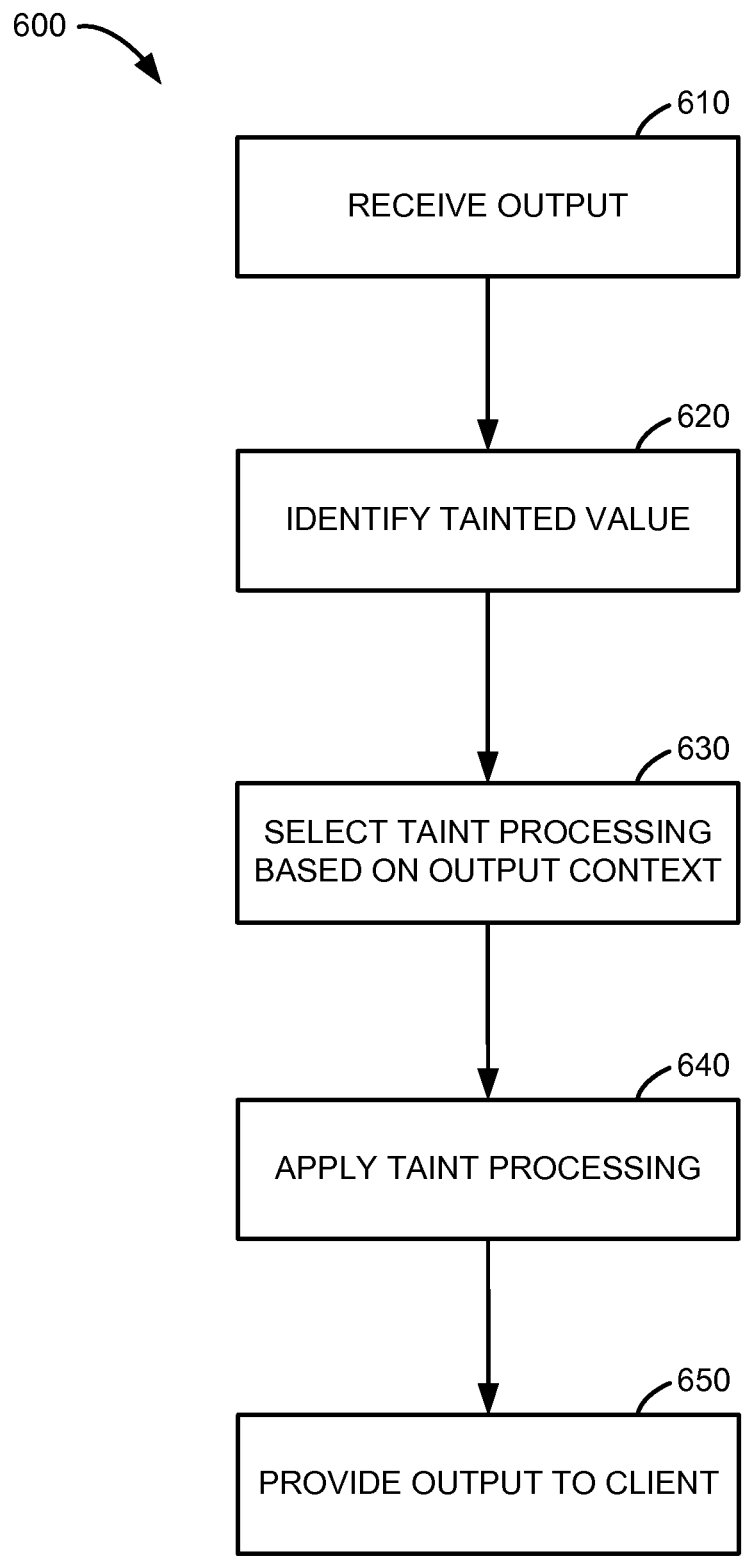
FIG. 6 is a flowchart of an application security process, according to another implementation.

FIG. 6 is a flowchart of an application security process implemented by an application security system such as, for example, application security system 525, according to another implementation. As illustrated in FIG. 5, output (e.g., data values output) from application 515 provided to application security system 525 via communications link 570 is received at block 610. In some implementations, metadata or other signals related to the output is also provided to application security system 525 via communications link 570 or some other communications link and received at block 610. Application security system 525 then identifies tainted values within the output at block 620 (e.g., based on tags included within the output or associated metadata). Additionally, application security system 525 determines output contexts of application 515 associated with those tainted values.

Additionally, application security system 525 selects taint processings to be for the tainted values based on the output contexts of application 515 associated with those tainted values at block 630, and applies those taint processings to the tainted values at block 640. Application security system 525 then provides the output from application 515 including the processed tainted values (i.e., the tainted values to which the taint processing were applied) to client 590 at block 650. In other words, application security system 525 receives output from application 515, processes the output by applying context-sensitive or—specific taint processings to tainted values within the output, and provides the processed output to the client. Thus, application security system 525 can mitigate security vulnerabilities such as XSS vulnerabilities or other code injection vulnerabilities.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. As another example, functionalities discussed above in relation to specific modules or elements can be included at different modules, engines, or elements in other implementations. Furthermore, it should be understood that the systems, apparatus, and methods described herein can include various combinations and/or sub-combinations of the components and/or features of the different implementations described. Thus, features described with reference to one or more implementations can be combined with other implementations described herein.

What is claimed is:

1. A non-transitory processor-readable medium storing code representing instructions that when executed at a processor cause the processor to:

associate a tag with a tainted value of an application, the tag to identify the tainted value as tainted;

determine an output context of the application associated with output from the application during runtime, the output including the tainted value, wherein the output context is one of a plurality of output contexts;

determine a context identifier associated with the output context;

select, using the context identifier, a taint processing from a plurality of taint processings;

apply the selected taint processing to the tainted value in response to the output of the tainted value, wherein the selected taint processing is compatible with the output context; and output the tainted value with the selected taint processing.

2. The processor-readable medium of claim 1, wherein the taint processing is an encoding.

3. The processor-readable medium of claim 1, wherein the tag includes a begin tag and an end tag, the output including the begin tag and the end tag, the tainted value included within the output between the begin tag and the end tag.

4. The processor-readable medium of claim 1, further storing code representing instructions that when executed at the processor cause the processor to provide the output to a client of the application after the taint processing is applied to the tainted value.

5. The processor-readable medium of claim 1, wherein:
the tag is included within the output; and
applying the taint processing to the tainted value includes removing the tag from the output.

6. The processor-readable medium of claim 1, wherein determining the output context includes interpreting the output.

7. A context-sensitive application security system, comprising:

an output context monitor to monitor a current output context of an output of an application during runtime, the output including a tainted value, and to determine a context identifier associated with the output context, wherein the current output context is one of a plurality of output contexts;

a taint processing module to select a taint processing from a plurality of taint processings based on the context identifier, and to apply the taint processing to the tainted value included in the output; and a delivery module to output the tainted value with the selected taint processing.

8. The system of claim 7, further comprising an output analysis module to identify the tainted value within the output.

9. The system of claim 7, wherein the taint processing is an encoding.

10. The system of claim 7, wherein the output context monitor monitors the current output context of the application based on the output.

11. The system of claim 7, wherein the taint processing is compatible with the current output context.

12. A context-sensitive application security method, comprising:

determining, by a processor, an output context of output from an application during runtime, the output including a tainted value, wherein the output context is one of a plurality of output contexts;

determining, by the processor, a context identifier associated with the output context;

selecting, by the processor, a taint processing from a plurality of taint processings based on the context identifier;

identifying, by the processor, the tainted value within the output;

applying, by the processor, the taint processing to the tainted value, the taint processing compatible with the output context; and outputting, by the processor, the tainted value with the selected taint processing.

13. The method of claim 12, further comprising receiving the output from the application.

14. The method of claim 12, further comprising monitoring the output context of the application.

15. The method of claim 12, further comprising providing the output after the taint processing is applied to the tainted value to a client of the application.

16. The method of claim 12, wherein the identifying is based on a tag associated with the tainted value.

17. The method of claim 12, wherein the identifying includes locating a begin tag and an end tag within the output, the tainted value included in the output between the begin tag and the end tag.

18. The method of claim 12, wherein the taint processing is an encoding.

* * * * *